(12) United States Patent
Seo

(10) Patent No.: US 7,904,066 B2
(45) Date of Patent: Mar. 8, 2011

(54) METHOD FOR PROVIDING INFORMATION OF TELEPHONE NUMBER OWNER USING WIRE/WIRELESS COMMUNICATION TERMINAL AND SYSTEM FOR IMPLEMENTING THE SAME

(76) Inventor: Seok-Bae Seo, Daejeon (KR)

( * ) Notice: Subject to any disclaimer, the term of this patent is extended or adjusted under 35 U.S.C. 154(b) by 1178 days.

(21) Appl. No.: 10/599,987

(22) PCT Filed: Apr. 20, 2005

(86) PCT No.: PCT/KR2005/001129
§ 371 (c)(1),
(2), (4) Date: Oct. 16, 2006

(87) PCT Pub. No.: WO2005/107294
PCT Pub. Date: Nov. 10, 2005

(65) Prior Publication Data
US 2008/0192911 A1   Aug. 14, 2008

(30) Foreign Application Priority Data

Apr. 22, 2004 (KR) .......................... 10-2004-0027979

(51) Int. Cl.
H04M 3/42 (2006.01)
H04M 1/56 (2006.01)
(52) U.S. Cl. .................................. 455/415; 379/142.15
(58) Field of Classification Search .................. 455/415; 379/142.01–142.18
See application file for complete search history.

(56) References Cited

U.S. PATENT DOCUMENTS 7,221,748 B1 * 5/2007 Moore et al. ............. 379/142.15

FOREIGN PATENT DOCUMENTS

| KR | 1020000050070 | 8/2000 |
|----|---------------|--------|
| KR | 1020020054144 | 7/2002 |
| KR | 1020020073865 | 9/2002 |
| KR | 1020030005085 | 1/2003 |

* cited by examiner

Primary Examiner — Michael T Thier
(74) Attorney, Agent, or Firm — Park & Associates IP Law LLC

(57) ABSTRACT

This invention is directed to the method and system of providing a call number owner's information to a communication terminal through an information communication network, comprising the steps of: (a) receiving a call number owner's information that includes at least a call number and a call number owner's name or its business name, from a plurality of call number owner's terminals and storing it; (b) receiving a call number taken from any one of a list of absent calls, received calls or sent calls held in a memory of the communication terminal, for which call number the owner's information is required by a call number management program run on the communication terminal; (c) reading the call number owner's information corresponding to the received call number in said (b) step from the stored call number owner's information in said (a) step and transmitting the information to the call number management program.

14 Claims, 8 Drawing Sheets

METHOD FOR PROVIDING INFORMATION OF TELEPHONE NUMBER OWNER USING WIRE/WIRELESS COMMUNICATION TERMINAL AND SYSTEM FOR IMPLEMENTING THE SAME

TECHNICAL FIELD

G06F17/60: Business Method Through Electronic Commercial Transaction

BACKGROUND ART

This invention is about the method and system to provide call number owner's information through information communication network. In detail, this is about the method and system to provide call number owner's information on the request of the user who has wire/wireless communication terminal.

Modern people recognize Mobile phone or PDA (Personal Digital Assistant) as necessary. Recently, as the terminal manufacturing technology and wireless communication develops rapidly, mobile communication terminal does simple telephone function and also can even provide multimedia service through internet in mobile environment.

So, Mobile communication users can search for contents, mobile game, chat with acquaintances, see movies, listen music, make reservation many kinds of tickets and also use online banking services.

But the basic function of mobile communication terminal is to talk with others. So it is basically equipped with a program that manages call number list.

The program stacks the information user enters which can be call number, number owner's name, address, e-mail address and home page address in the memory of terminal. If user requests call number, the program reads call number list and shows it on the screen equipped with the terminal. Then user presses the 'send' button and can talk with the call number owner.

But it is very annoying that user enters the information by himself. When he changes the terminal, it becomes more annoying. As we know, mobile telecommunication agent give the service of moving the information to a new terminal. But the service is useless if user lost his terminal.

To use the program, user should know number owner's information in addition to the number. If user knows the number but doesn't know the information, the systematic management of numbers is not possible.

For example, imagine the case that user temporarily wrote down only call number. But sometimes when management is required, user can't remember the owner's information. In this case, user should call the number or use 114 service for which user should spend money unnecessarily.

While modern people use name card to give their information. If the information should be memorized, user stores it in the mobile communication terminal and manages.

In case they don't have name card, they should write down the information or tell others in voice and listeners should store it in the terminal. But it is cumbersome to the senders and receivers.

DISCLOSURE

Technical Problem

This invention is for the method and system which can send number owner's detailed information through information network even if user knows only the number so that user can manage the list systemically.

Technical Solution

Information provider loads his call number, name and firm name on the server of information service provider's server. The information is searched by the number selected and provided by the information service provider. Service user connects to the server and then search the information by the log of call which was sent, received and not received and then downloads the information repeatedly, so the user can generate call number list and update it automatically.

Advantageous Effects

By using this invention, user can manage the list of call numbers just by number and it is not necessary to try to get owners' information. So user doesn't need to exchange name card or memo and can generate the call number list very easily.

And even though user's terminal is lost or changed, user can restore the list easily using the list backed up in the service provider's system. Further, the information which service provider's system sends to provide call number list can have image information, so user can recognize the owner more easily. And if the image consists of commercial images, the owner can get the benefit of commercial advertisement.

DESCRIPTION OF DRAWINGS

Drawings attached to this specification are examples of using this invention correctly and are for helping the understanding the technical thought whose detailed explanation is described later, so you should not limit this invention to articles described in the drawings.

Drawing 1 is about the network configuration to implement providing call number owner's information through mobile communication terminal.

Figure 1:
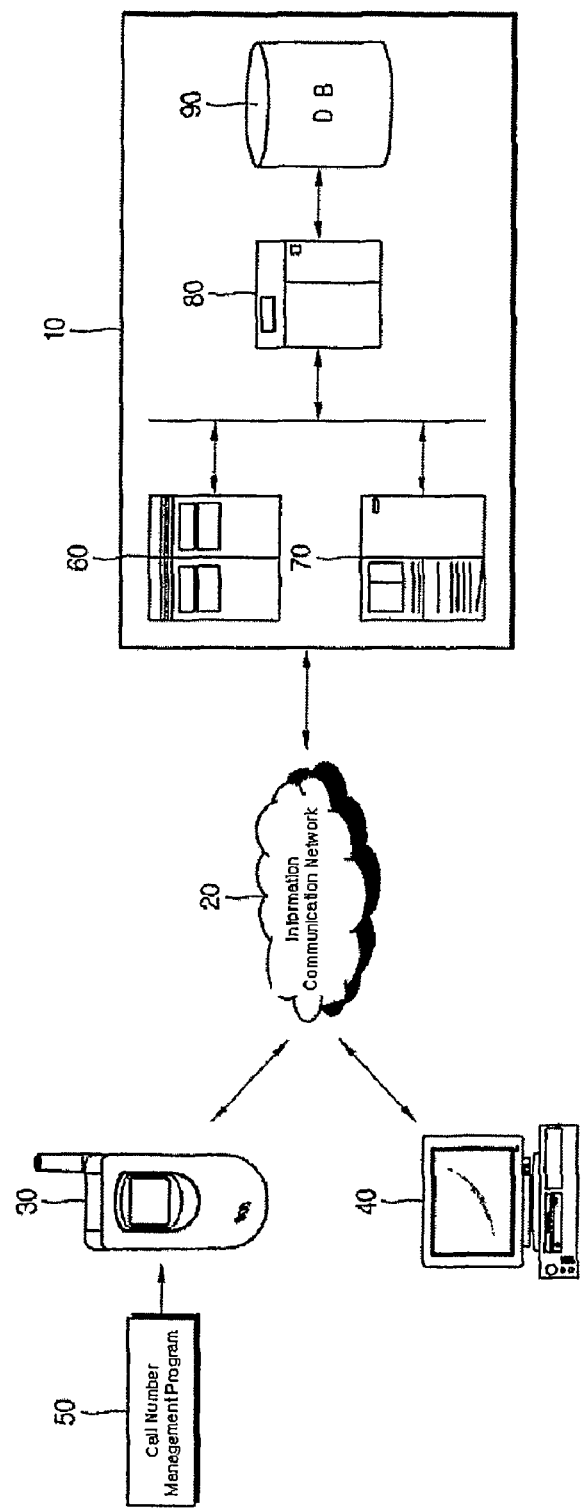
Figure 2:
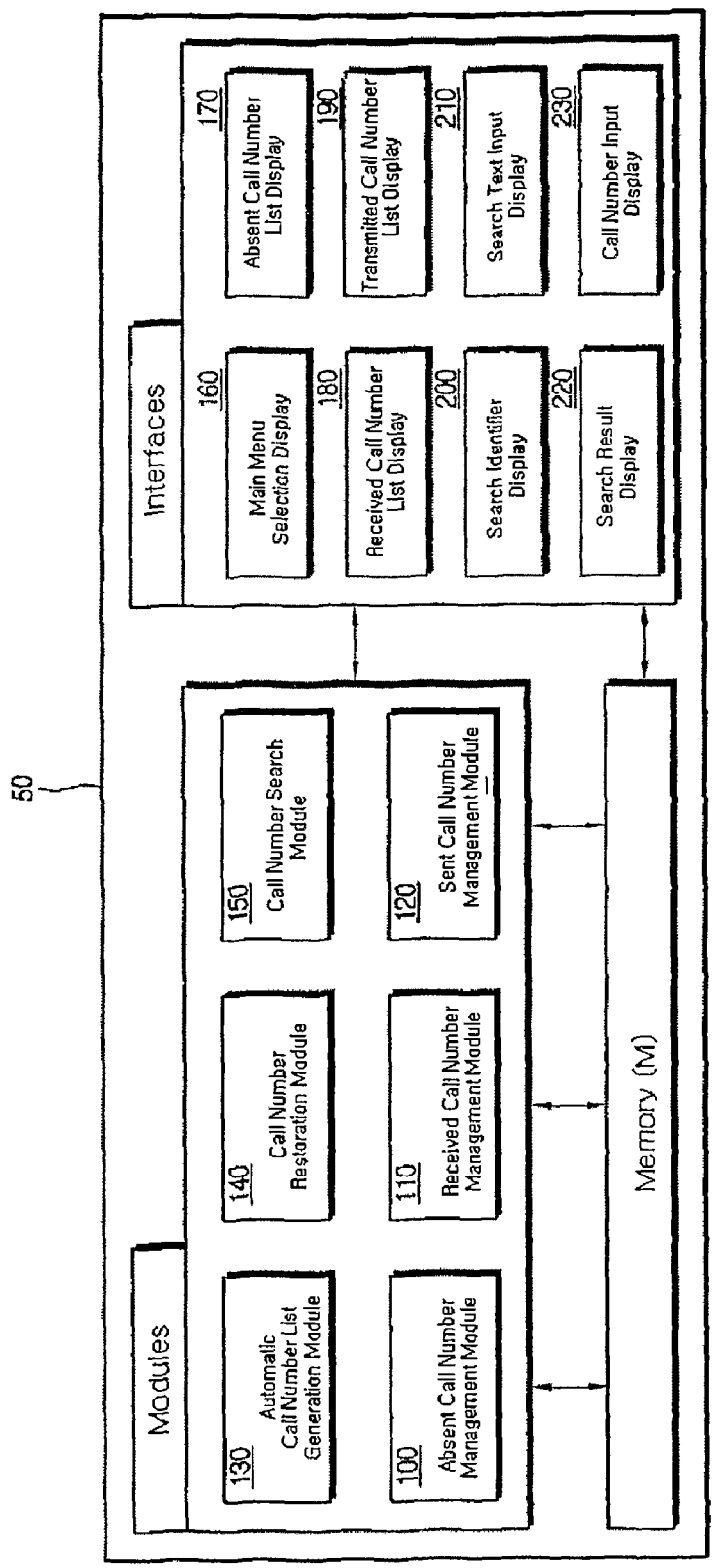
Figure 3:
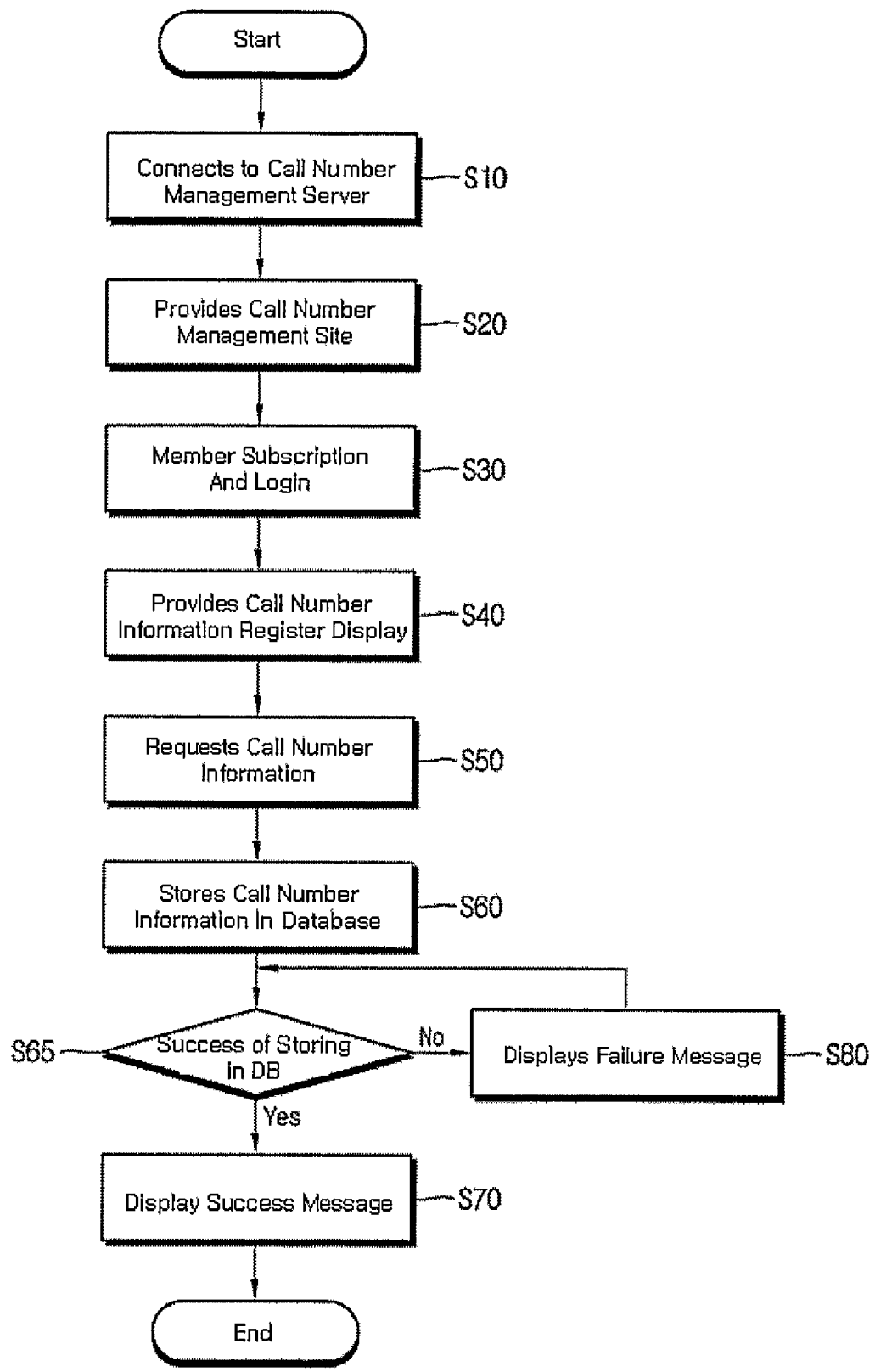
Figure 4:
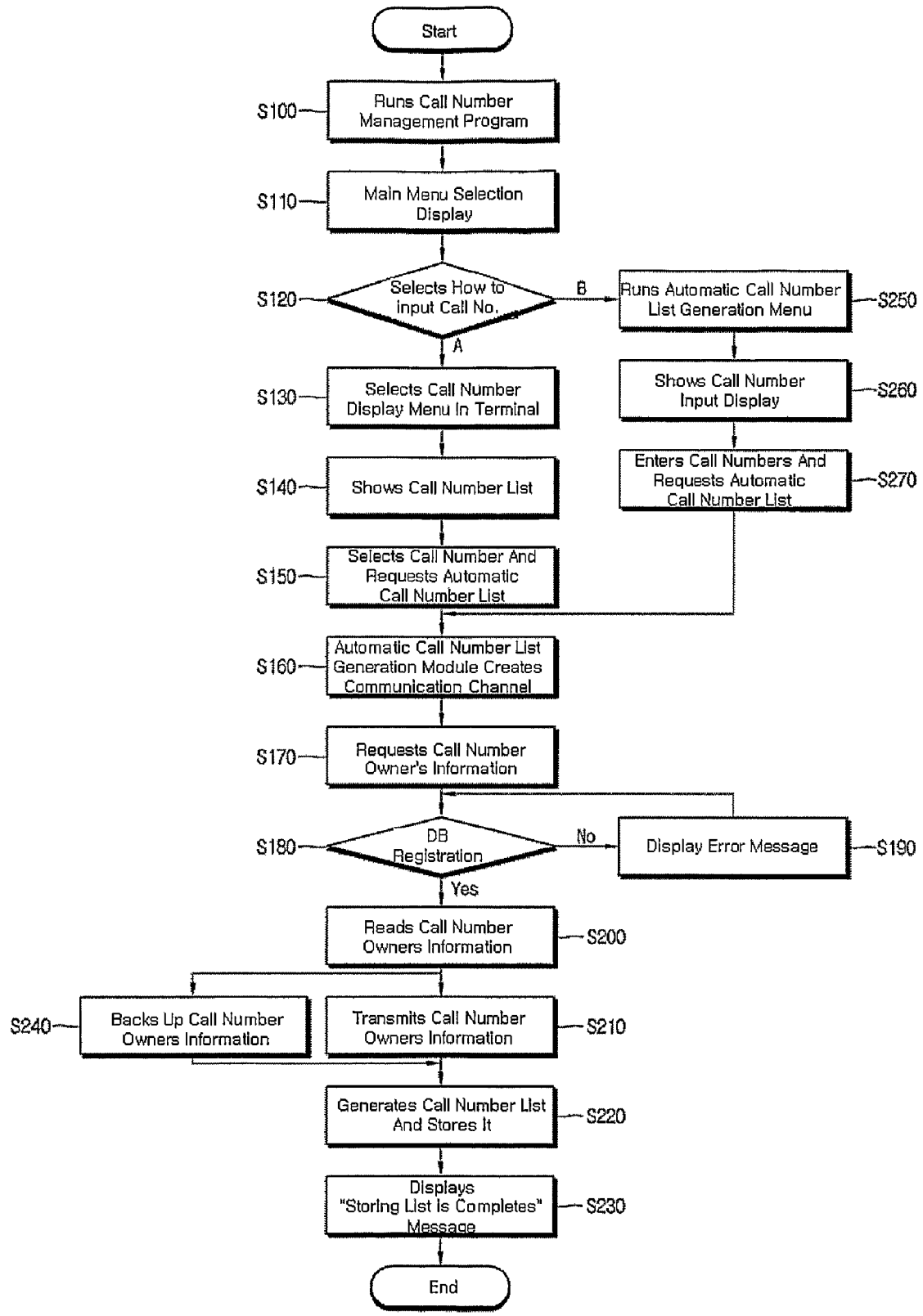
Figure 5:
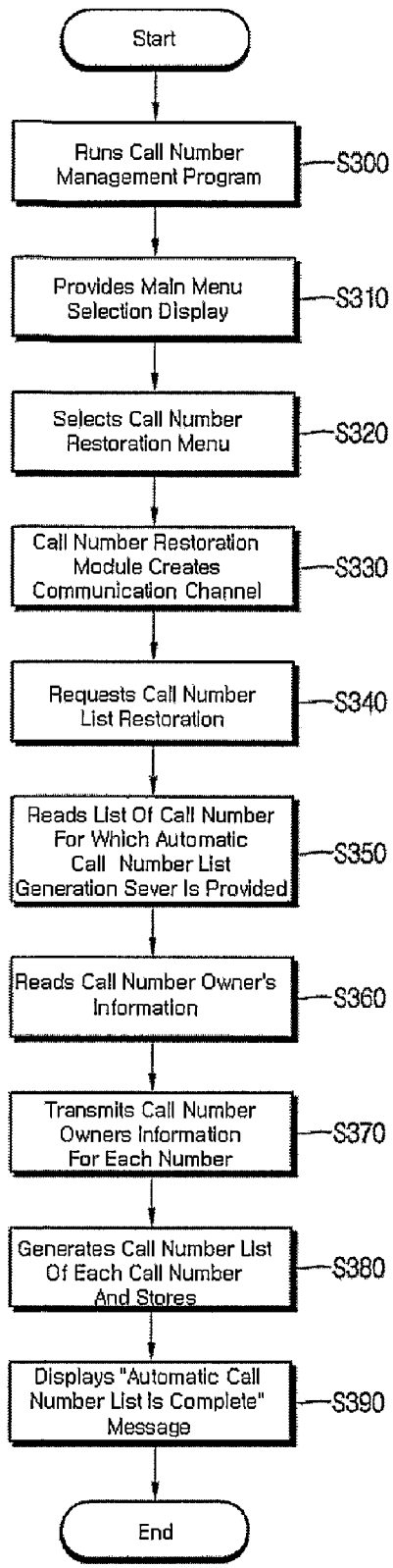
Figure 6:
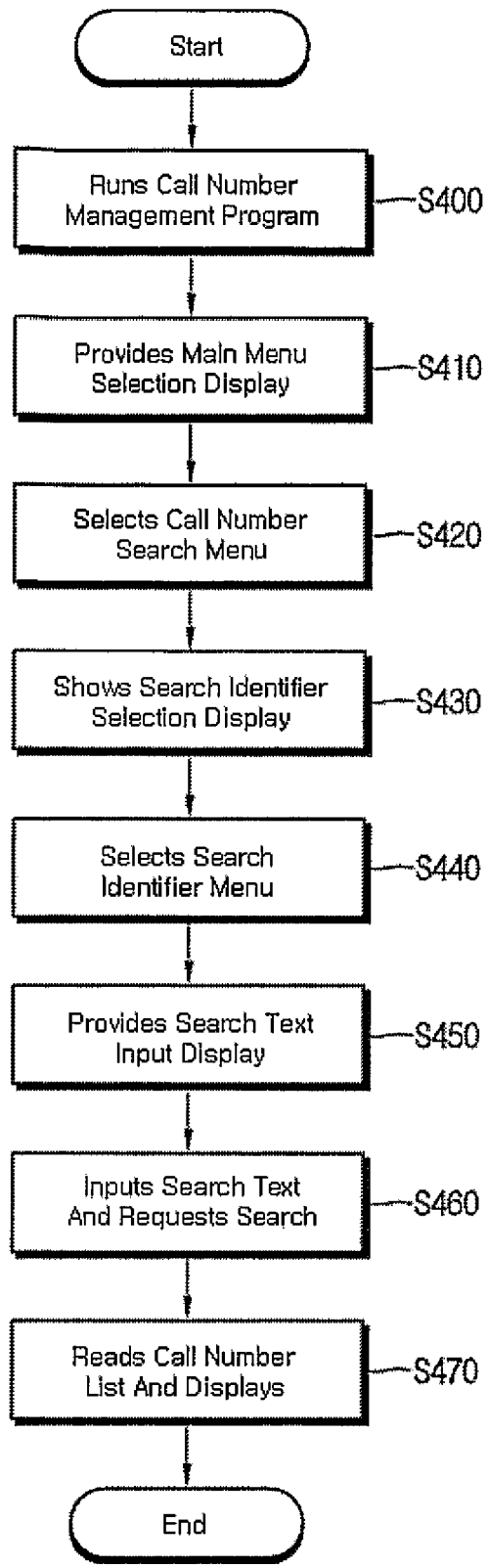
Figure 7:
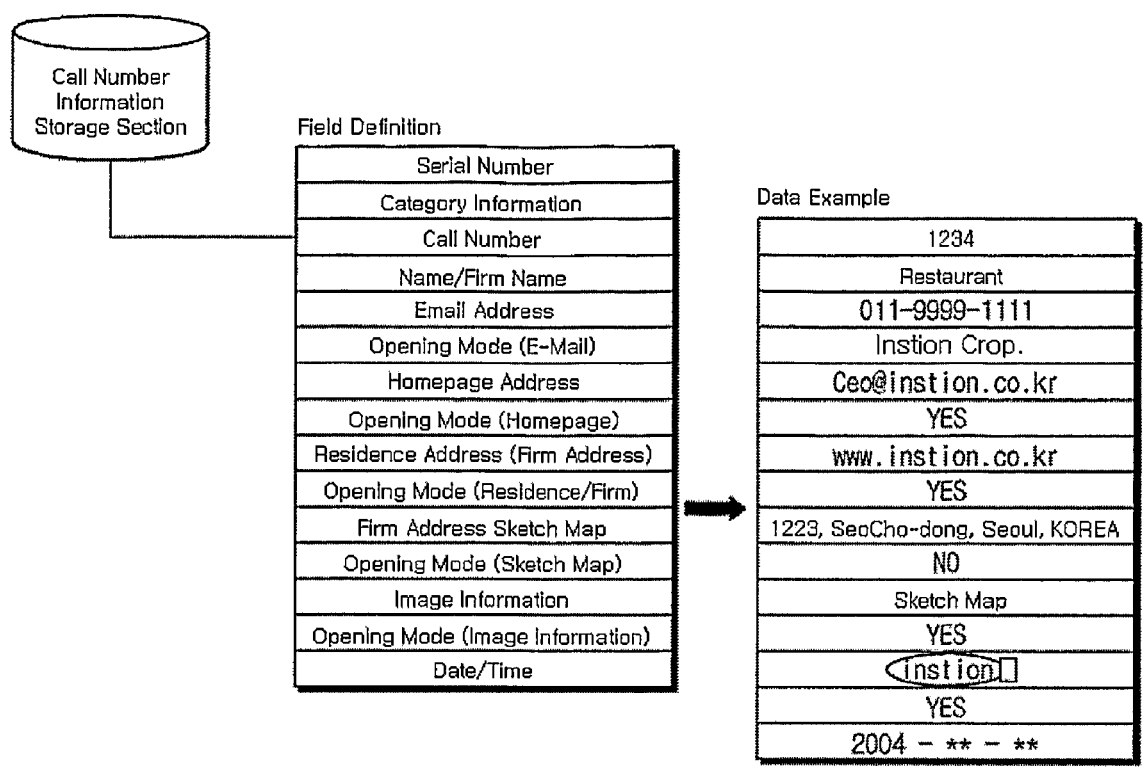
Figure 8:
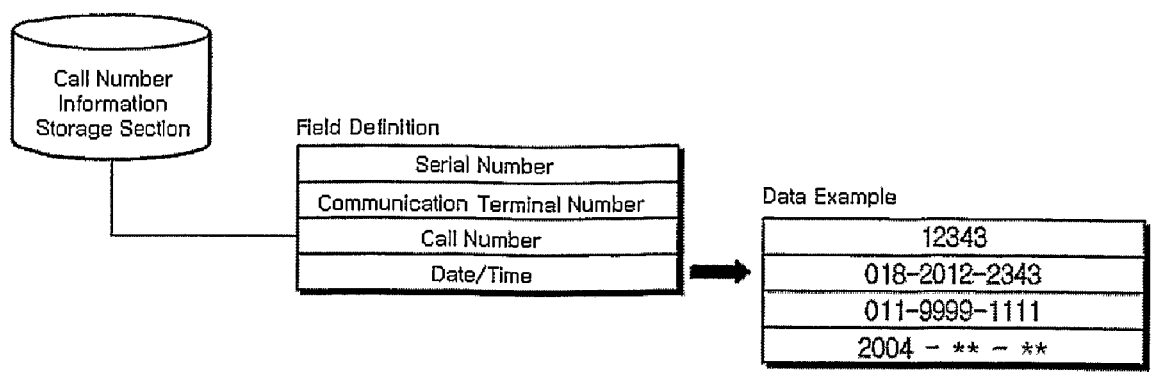

Drawing 2 is about call number management program module configuration.

Drawing 3 is about the flow of process which user connects to service provider's system and registers call number information.

Drawing 4 is an example of the flow of process which service provider's system sends call number owner's information to a mobile communication terminal.

Drawing 5 is example flow of process which service provider's system sends the call number owner's information backed up in the system to a mobile communication terminal.

Drawing 6 is example flow of process which user searches for call number using the call number stored in the user's terminal.

Drawing 7 and 8 are examples how to implement service providers' database to store call number information and back up.

MODE FOR INVENTION

The way to provide call number owner's information using wire/wireless communication terminal to implement this invention has the feature of having the stages of a) storing call number, owner's information like name or firm name from large number of users' terminals b) receiving the list of call numbers, whose owner's information is provided, from the management program run on terminals c) getting call number owner's information which corresponds with the call number received at the stage b from the call number owner's information list already stored and transmitting the information d) and management program's pairing the number owner's information received at the stage c with call numbers, then generating call number list and storing in the memory of terminal.

This invention can include a stage that the system pairs call number of owner's information sent to the call number management program and communication terminal number and backs up.

In this case, this invention can include the stages below.

The stage that the system receives communication terminal number and at the same time receives the call number list restoration request; the stage that the system reads the call number corresponding with the terminal number from the backup list; the stage that the system reads each call number owners's information from call number owner's list stored already for the call number which was read and transmits the data to the call number management program; and the stage that the management program creates call number list automatically from call number owner's information transmitted at the stage above and stores in the memory of communication terminal.

If call number owner's information is received from other source, the call number owner's information-providing system that provides call number owner's information through wire/wireless communication terminal using this invention provides call number owner's information through information communication network to the communication terminal that has call number management program which generates call number list automatically. The system has features of having call number management server which creates database from call number owner's information having at least call number and owner's name or firm name from call number owner's terminal and provides call number management site; and call number information-providing server that receives call number from call number management program run on communication terminal and transmits the information that corresponds with the number requested in the database that has call number owner's information.

In this invention, the call number information server can back up in the database by pairing call number whose owner's information is sent to the call management program and communication terminal number.

In this case, at the same time when communication terminal number is received from the call number management program the call number information-providing server can get request of restoring call number list, read call number that corresponds with the communication terminal number from the backup list and transmit the call number owner's information which corresponds with the call number from the call number owners' list to the call number management program.

In this invention, call number owner's information can have category information as additive information. Also, call number owner's information can have e-mail address, residence address (firm address), home page, image information, sketch map or selective combination of these as additive information. Image information can be owner's photograph or advertisement image. It is recommended that owner can choose whether the information will be public or private. And it is allowed for user to choose the information opening mode as non-private mode.

In this invention, the call number which is used for providing call number owners information is can be a number list of absent call, received call or sent call. Alternatively, the call number can be entered by user.

The appropriate and practical example of how to use mobile communication terminal will be given by the drawing below. Before that, reader should not limit specifications and terms or words to common or dictionary interpretation but should recognize that the inventor used these to explain most effectively. So the example shown and configuration of drawing are just best examples and don't show all thoughts of this invention and also there can be diverse equivalence and modified examples.

Drawing 1 is an practical example of network configuration which is used for providing call number owner's information through mobile communication terminal.

By the drawing, it is shown that system provider's system (10) makes the communication possible between possible user's mobile communication terminal(30) which connects for managing call numbers systemically through information communication network(20) and call number owner's terminal(40) which connects for managing call number and its related owner's information systemically through the service provider's system In the drawing, information communication network(20) can mean wire internet, wireless internet, wire telephone network or selective combination of these. So information communication network(20) can be interpreted different depending on clients which connect(30,40) to service provider's system(10) to communicate.

It is more appropriate that the communication between the service provider's system(10) and call number owner's terminal(40) is made through wire internet and the communication between the provider's system and mobile communication terminal is made through wireless internet. But, this invention is not limited to this and any kind of network is adoptable to make the intercommunication between the service provider's system(10) and client(30,40) created. The communication technology for intermediate data transmission between the service provider's system(10) and the clients(30,40) is well known, so its explanation is not included here.

The terminals like mobile phone and PDA which can connect to internet and also function as a phone are appropriate for the mobile communication terminal(30). These mobile communication terminals' functions are already implemented on most hand-held terminals and its explanations are not included here.

While mobile communication terminals(30) has call number management program(50) which will be described later. The call number management program(50) systemically manages the call number list having the owner's information just by target call number for the mobile communication terminals(30). For this, call number management program (50) connects to the service provider's system through information communication network(20) and executes network communication with the system(10).

The call number owner's information includes information like at least name, firm name, e-mail address, home page, residence address (firm address), image information, sketch map which owner uses to represent himself by relating it with his call number. At other practical example, call number owner's information can include category information necessarily. Image information means owner's photograph or advertisement in this invention.

The person who registers and manages call number and its owner's information uses call number owner's terminal(40) and it can execute network communication with the service provider's system(10). In this invention, cell number owner's terminals(40) can include desktop PC, notebook, PDA and mobile communication terminal but it is not limited to these.

If mobile communication terminal(30) gets call number registered in the service provider's system using a method, it runs call number management program(50) and receives the information which corresponds with the number from the service provider's system and automatically creates the call number list.

The service provider's system(10) has call number management server(60), call number information-providing server(70), database server(80) and high capacity database (90) which is managed by database server(80).

The call number management server(60) provides interface through which user can register and update the call number and its related call number owner's information. This interface is also possible for wire/wireless communication and almost is web site accessible by publicly known web browser.

The call number management server(60) has unique URL (Uniform Resource Locator) and call number owner executes a browser and connects to call number management server (60) by entering the URL.

The call number management server(60) collects call number and its related call number owner's information and then cooperate with database server(80) and registers collected data on database(90). The information must at least include call number and call number owner's name or firm name and it will be better it has e-mail address, home page address, residence address (firm address), image information (advertisement image or owner's photograph), sketch map or selective combination of these. Except call number and its owner's name, it is recommended that whether other information is public or not is decided by user.

Selectively, the call number management server(60) can collect category information when collecting other information related with call number. Such category information can be useful if call number owner runs some business (for instance, restaurant). The category information can be a identifier of classifying call number and its owner's information hierarchically.

The database(90) has storage section for call number information. The call number storage section has data fields in which each information collected by call number management server(60) is stored.

The call number information-providing server(70) executes network communication with call number management program(50) run on mobile communication terminal through information communication network. This communication begins by call number management program(50).

The call number information-providing server(70) receives call number owner's information which is related with specific call number from call number management program(50) through information communication network (20). And then, cooperates with database server(80), reads the owner's information and transmits the information to call number management program(50) running on mobile communication terminal(30). Then, the call number management program(50) gets the information and creates call number list and stores in the mobile communication terminal(30), making call number list generation and systematic management possible just by call number.

And the call number information-providing server(70) pairs call number owner's information and mobile communication terminal(30) number and cooperates with database server(80) to back up in the database(90). If call number owner's information is backed up, user can easily download the data which was stored in the database and create the call number list as the previous state in case of losing terminal(30) or changing terminal.

The database(90) has backup information storage section for call number owner's information transmission list. The backup information storage section has fields in which call number whose owner's information was transmitted and mobile communication terminal(30) number are stored.

Drawing 2 is about call number management program module which is embedded in mobile communication terminal.

By the drawing, the program has absent call number management module(100), received call number management module(110), sent call number management module(120), automatic call number generation module(130), call number restoration module and call number search module(150). And the call number management program(50) has various user interfaces to interact with user.

The absent call number management module(100) stacks the call number, which was not received, in the buffer memory(M) of mobile communication terminal(30). On user's request, it displays the call numbers on the screen(170). It is recommended that the most recent call is sorted on the first line.

The received call number management module(110) stacks the call number which was received in the buffer memory(M) of mobile communication terminal(30). On user's request, it displays the call numbers on the screen (180). It is recommended that the most recent call is sorted on the first line.

The sent call number management module(120) stacks the call number which was transmitted in the buffer memory(M) of mobile communication terminal(30). On user's request, it displays the call numbers on the screen (190). It is recommended that the most recent call is sorted on the first line.

The automatic call number generation module(130) creates communication network with provider's information-providing server(70) and request the call number owner's information on request of user about the call number of absent call number list, number list of received call or number list of sent call. And then the service provider's system sends the owner's information, the program creates automatically the list and stores in the 1st section of memory of mobile communication terminal(30).

If owner's information has a category information, it is recommended that when call number owner's information is transmitted, the category information is also transmitted. In this case, automatic call number generation module(130) adds the category information in the 1st memory section and makes it possible searching call number list by category.

The automatic call number generation module can also create the list by number input by user through the call number input interface of mobile communication terminal(30).

Further, The automatic call number generation module (130) can provide a interface that has the batch automatic creation command to create the list through the steps described above by using absent call list, list of received call, list of sent call or selective combination of these.

It is recommended that the automatic call number generation module(130) transmit at least the data packet of mobile communication terminal(30) number and the numbers required for automatic generation of the list to request call number owner's information from the call number information-providing server(70). If multi automatic list generation processes are executed, the data packets can have multi-call numbers.

The call number restoration module(140) creates communication channel to service provider's call number information-providing server(70) and receives call number backed up in the system on the request of user. The transmitted data includes call number and owner's information downloaded from the service provider's system in the past. The call number restoration module(140) is very useful in case of losing or changing mobile communication terminal(30).

For the restoration service, service provider's call number information-providing server(70) cooperates with database server(80), queries the backup information storage section for the data corresponding with the mobile communication terminal number(30), reads the call number list corresponding the mobile communication terminal(30) number, reads the call number owner's information in the database(90) and finally transmit the call number owner's information through the information communication network(20) to the call number restoration module(140).

And then, the call number restoration module(140) generates the call number list using the call number owner's information transmitted and stores in the 1st section memory(M) of mobile communication terminal(30). So, the call number information which was downloaded in the past is restored in the memory(M) of mobile communication terminal(30).

The call number search module(150) provides the service that searches the call number list in the 1st memory section of mobile communication terminal(30). For it, the call number search module(150) provides the interfaces user can select search identifier and user can input search text and query the call number. The search identifier can be call number; call number owner's name, firm name; e-mail address; residence address (firm address); home page address; category information of the call number owner or selective combination of these.

The call number search module(150) gets the input of the search identifier or search text and then reads the call number list from the 1st memory of mobile communication terminal (30). Finally it shows the call number list on the display(220) of mobile communication terminal(30). If user selects the call number and presses the send button, the call number search module begins the process of creating conversation channel for the number owner.

And the call number management program should provide the interface user can generate the list and manage the list by himself. It is recommended that the call number user input is stored in the 2nd memory(M) section of mobile communication terminal(30). It is for discriminating the call number generated automatically and the call number input by user differently but this invention is not limited to this.

It is recommended that the call number program has the ability that the call number list can be transferred to other memory section.

The appropriate practical example of providing call number owner's information using the mobile communication terminal(30) of the description above is shown below.

Drawing 3 is about the flow of process that call number owner's information is registered to the service provider's system.

Referencing drawing, call number owner runs browser on the terminal(40) and connects to the call number management server of service provider's system through information communication network(20). And then, the call number management server(60) transmits the main display of call number management site to the call number owner's terminal(40) (S20). The management site can be a general web site or be a site for wireless communication.

Next, the call number owner subscribe the site by entering member ID and password and login the call number management site as a member. The call number management server (60) cooperates with the database server(80) to stores the call number owner's information in the member information storage section of the database(90). The member information has member ID, password, e-mail address, address, call number and so on and the storage section has fields for these.

After the stage S30, the call number owner requests call number register in the call number management server(60) using a menu of the management site. Then the call number management server(60) provides the display for registering the call number information(S40). The call number register display provides the interface that user enters name or firm name, e-mail address, address, image information (advertisement or owner's photograph), sketch map and so on and selects whether these are public or not. It is recommended that call number, owners name or firm name should be entered. And also the display can has a interface user can enter category. The category information can be entered by user or selected by the user between the categories provided by the call number management server(60). It is recommended that the category information is not selectable where it is public or private but this invention is not limited to this.

After call number information display is provided at S40, call number owner enters each information, selects the mode of being public/private and requests the call number register to the call number management server(60)(S50). The call number management server(60) receives the call number register information through the information communication network(20) and stores in the call number information storage section of database(90)(S60). The information stored is shown in the drawing 7 as an example. If call number information has category, though it is not shown in drawing 7, call number information list stored in the call number storage section should have category information. After call number information is stored in the database at S60 (which is 'YES' of S65), the call number management server(60) sends the 'success' message to the call number owner's terminal(40) through the information communication network(20)(S70). In reverse, if the call number management server(60) fails in storing in the database, the call number management server (60) sends the 'failure' message to the call number owner's terminal(40) through the information communication network(20)(S80). The processes are repeated for many users, so large amount of call number information is registered in the database(90) of service provider's system(10) and managed. It is needless to say to the worker who has general knowledge about this technology that call number owner's information registered in the database(90) of service provider's system (10) can be deleted and updated by the owner.

The call number management server(60) will be able to provide on line call number search service using the data collected from the users and stored in the database(90). To do that, the call number management server(60) can provide web service which cooperates with the database(90) and has call number search function. For the function, it is recommended that the site has the interface which makes it possible to search call number by selective combination of detailed call number owner's information list. If call numbers are provided on the web page, call number whose mode is private shouldn't be displayed.

Drawing 4 is about the flow of process that mobile communication terminal user stores the call list in the memory just by call number as an practical example of this invention.

Referencing the drawing, user runs the call number program(50). Then the call number management program(50) is executed and the mobile communication terminal(30) shows main menu selection display(160) on the screen.

The main menu selection screen(160) includes display menu of absent call number, display menu of call number received, display menu of call number sent, call number search menu, automatic call number generation menu, call number restoration menu.

If the main selection menu screen(160) is displayed, the user chooses whether he will generate call number list by entering call number or will make automatically from the call number list of absent call or sent call stored in the memory(M) of mobile communication terminal(30)(S120).

In the case of 'A' of S120, mobile communication terminal (30) user chooses a menu from absent call display menu, display menu of call number received or display menu of call number sent(S130). Then, the call number management program(50) shows absent call number list, list of call number received or list of call number sent on the display on the request of user(S140). The call number management program (50) selectively reads from the absent call number list, list of call number received or list of call number sent which was stored in the mobile communication terminal(30) and displays it on the screen of mobile communication terminal(30).

If the call number is displayed at the S140, user selects a specific call number and commands the call number management program(50) to generate the call number list automatically(S150). The command is transferred through key pad and key pad instruction should be provided on the call number list display. For example, the call number list display can have specific key pad information on the bottom of the display of list.

If automatic call number list generation command is transferred at S150, automatic call number list generation of call number management program(50) creates communication channel with the service provider's call number information-providing server through wireless internet. And then, user transmits the selected call number and mobile communication terminal(30) number at S150 and requests call number owner's information(S170).

Then, the call number information-providing server(70) cooperates with the database server(80) to check whether call number information storage section has owner's information corresponding with the terminal's number. If owner's information of the call number doesn't exists ('NO' of S180), call number information-providing server(70) transmits the massage that 'call number owner's information doesn't exist' through the information communication network(20). So mobile communication terminal(30) displays the error message.

In reverse, if owner's information of the call number exists ('YES' of S180), call number information-providing server (70) cooperates with the database server(80) to reads owner's information corresponding with the call number transmitted from the mobile communication terminal(30) and sends only the information whose mode is public(S200).

And then call number information-providing server(70) transmits the call number owner's information through the information communication network(20) at the S200 to call number list automatic generation(130) module of call number management program(50). The call number owner's information should include owner's name, firm name and can have e-mail address, home page address, address (firm address), image information, sketch map or selective combination of these. If call number owner's information has category, the call number owner's information can have category information.

Then automatic call number list generation module(130) stores in the 1st memory(M) of mobile communication terminal(30) after pairing the call number owner's information transmitted from the call number information-providing server(70) and the target call number of automatic call number list generation module(S220). The automatic call number list generation module(130) assigns list number by adding 1 to the last number of the list in the 1st memory section.

If automatic call number list generation is completed at S220, the automatic call number list generation module(130) displays the message that call number list generation is completed on the screen and automatic call number list generation routine is completed.

On the other hand, call number information-providing server(70) backs up the call number owner's information transmission list in addition to the process which transmits the call number owner's information to the mobile communication terminal(30)(S240). The call number information-providing server(70) backs up in the backup information storage section of database(90) by pairing the call number whose owner's information is transmitted and the number of the mobile communication terminal(30) to which call number owner's information is transmitted.

The backup information is shown drawing 8.

The technicians in this field can predict that user will repeat the process above as long as he wants.

In the example described above, the call number list is automatically generated by using the call number list (absent call, received call, or sent call) stored in the buffer of memory of mobile communication terminal(30). But in other practical example, user will be able to input call number list in the mobile communication terminal(30) directly.

In this case, mobile communication terminal(30) user selects automatic call number generation menu(S250) provided at the S110 and then automatic call number list generation module(130) of call number management program(50) shows the display on the screen user can enter call number (S260).

If call number input display is shown at S260, mobile communication terminal(30) user commands call number management program(50) to execute automatic call number list generation after entering a call number in the input display. This command is made by key pad. And the key pad can be instructed in the call number input display(230).

If automatic call number list generation is completed at S270, process goes to S160 and call number list is generated automatically as described above and is stored in the 1st memory section of mobile communication terminal(30).

Though it is not shown in detail, in other practical use, batch of call number list generation for multi-call number is possible. For the batch, the call number management program (50) can provide the command of batch list generation for the numbers of absent call list, received call list or sent call list. In this case, user can transmit multi-request for the multi-number of absent call, received call or sent call by selecting the batch command. Then the automatic call number list generation module(130) transmits repeatedly the request of the process described above for the each of multi-numbers.

In the modified practical use, the main menu selection menu can have automatic call number list generation menu. If user selects the menu, the automatic call number list generation module(130) can make call number list in batch by repeating the process of automatic call number list generation for the each of all numbers of absent call, received call or sent call.

Drawing 5 is about the flow of process mobile communication terminal(30) user restores the call number list an practical example of this invention. The restoration of call number is useful in case of losing mobile communication terminal or changing terminal but this invention is not limited to the case.

By referencing the drawing, first, mobile communication terminal(30) runs call number management program(50) (S300). Then the call number management program(50) shows main menu selection display(160) on the screen.

If main menu selection menu is displayed at S310, mobile communication terminal(30) user selects call number restoration menu(S320). Then call number management program (50) creates communication channel with call number information-providing server(70) through information communication network(20)(S330). Then the call number list restoration module(140) transmits mobile communication terminal's number to the call number information-providing server(70) and requests restoration of call number list(S340). Then the call number information-providing server(70) cooperates with database server(80) to search the backup information storage section of database(90) and reads the list of call number which corresponds with the mobile communication terminal's number and was transmitted to the terminal(S350). Then, the call number information-providing server(70) reads the owner's information stored in the call number information storage section but only the information whose mode is set public. Then, it transmits the call number owner's information for each call number to call number restoration module(140) through information communication network(20)(S370). The data packet which is transmitted to mobile communication terminal has more than one sub-packet, in which call number and the owner's information is related logically.

And then, the call number restoration program(140) creates call number list automatically by referencing the sub-packet and stores in the memory of the terminal.

If call number list is generated at S380, the call number restoration module shows the message that backup call number list is generated on the screen of the mobile communication terminal(30)(S390). By doing so, in case of losing terminal or changing terminal, user can manage the list by restoring the call number list easily to the previous state.

Drawing 6 is about the flow of process user searches call number in the call number list stored in the mobile communication terminal as an practical example.

Referencing the drawing, mobile communication terminal (30) runs call number management program(50)(S400). Then the call number management program(50) shows main menu selection menu display(230) on the screen(S410). Then the call number search module(150) of the call number management program(50) shows search identifier selection display (200) which includes menu through which user can search call number by the identifier on the screen(S430).

The search identifier selection menu display(200) includes category search menu, call number search menu, name (firm name) search menu, e-mail search menu, home page search menu and residence address search menu.

If search identifier selection menu display(200) is shown, user selects a search identifier menu(S440). Then the call number search module(150) shows display on the screen in which user can enter search text corresponding with the selected search index (S450).

If search input display is shown, mobile communication terminal(30) user enters a search text and command call number search module(150) to search the data. Then call number search module(150) searches from the list in the 1st memory section and shows the list corresponding with the text on the screen of the mobile communication terminal(30)(S470). It is clear that the call number search module(150) searches for the number list using the search identifier. The search identifier can be category, call number, name (firm name), residence address, e-mail address, home page address or selective combination of these. If call number search module(150) doesn't find the number, the module shows the message that there is no call number on the screen of mobile communication terminal(30).

If call number is displayed at S470, mobile communication terminal(30) user confirm the call number owner's information as he doses up to now or give a call to the owner.

Though not shown in the drawing, call number owner's information confirmation display can have button which is for call number update. In this case, user requests the call number update using the button. Then call number restoration module (170) of call number management program(50) creates communication channel with call number information-providing server(70) and requests the call number owner's information again. Then the call number information server(70) cooperates with the database server(80) to search the owner's information corresponding with the requested number and transmits the data to the call number restoration module(140). Then the call number restoration module(140) updates the call number information using the owner's information transmitted. The technician in this technology field can predict that call number update can happen repeatedly for multi-call number.

In this invention, the call number owner's information selectively have owner's image information (advertisement image or photograph). This has benefit that user can confirm call number owner's image (especially the photograph image). Also it has benefit that if call number owner who does business uses advertisement image as the image, he will can have the effect of advertisement of his business.

As shown above, though this invention is explained by a few examples, this invention isn't limited to it and the technicians who has general knowledge in this field can change and modify diversely in the range of technical thought and even range of request range for patent.

For example, this invention can be applicable for updating of call number list of wire digital phone which has internet connection function and also uses many additive information service. In this case, the wire digital phone must have call number management program and execute network communication with service provider's system through wire internet.

INDUSTRIAL APPLICABILITY

This can supplement the current call number information system which primarily is name and firm name and service provider can provide the users the service by which users can create their own list and manage, using the information stored in the provider's system. The information stored in the service providers' system is directly registered by user, so service provider can provide information-providing service based on personal information. If the information stored in the service provider's server is linked with mobile phone, call number information service of mobile phone, whose use is bigger than wire phone, is possible.

The invention claimed is:

1. A method of providing a call number owner's information to a wired or wireless communication terminal through an information communication network, the method comprising the steps of:
   (a) providing call number owner's information through the wired or wireless communication terminal;
   (b) receiving a communication terminal number and a request of call number store restoration;
   (c) reading each call number owner's information from a call number owner's list already stored for each call number and transmitting it to the call number management program;
   (d) using the call number owner's information already transmitted and automatically generating the call number store to store in a memory of the communication terminal;
   (e) receiving a call number owner's information that includes at least a call number and a call number owner's name or its business name, from a plurality of call number owner's terminals and storing it;
   (f) receiving a call number taken from any one of a list of absent calls, received calls or sent calls held in a memory of the communication terminal, for which call number the owner's information is required by a call number management program run on the communication terminal;
   (g) reading the call number owner's information corresponding to the received call number in said (f) step from the stored call number owner's information in said (e) step and transmitting the information to the call number management program;
   (h) pairing the call number with a communication terminal number to which the call number owner's information is transmitted in said (g) step and to store the pair data as a backup record; and
   (i) using the call number management program to automatically generate a call number store by matching the corresponding call number owner's information transmitted in said (g) step with the received call number in said (f) step, and storing it in the memory of communication terminal.

2. The method of claim 1, wherein the call number owner's information provided by said (a) step has features of having a category information as additive information through the wired or wireless communication terminal.

3. The method of claim 2, wherein the call number owner's information includes call number owner's e-mail address, residence or business address, home page address, image address, sketch map, or selective combinations of these, through the wired or wireless communication terminal.

4. The method of claim 3, further comprising the step of providing the image information which can be call number owner's photograph or advertisement image through the wired or wireless communication terminal.

5. The method of claim 4, further comprising the step of providing the call number owner's information having additive information through the wired or wireless communication terminal.

6. The method of claim 1, wherein a call number information-providing server provides the call number which has a feature of being entered by the communication terminal user directly by the wired or wireless communication terminal.

7. The method of claim 1, wherein the communication terminal has a feature of being mobile communication terminal or a wire digital phone provides call number owner's information by the wired or wireless communication terminal.

8. A communication system, comprising a plurality of owner terminals each of which has a call number management program which automatically generates a record of call numbers taken from either an absent call list, a received call list or a sent call list, and a service provider's system including:
   (a) a database of call number owner's information including at least a call number and a call number owner's name or its business name;
   (b) call number management means adapted to store in the database, data which is collected from a plurality of owner terminals through an information communication network;
   (c) call number information-providing means adapted to receive a call number from a call number management program run on an owner terminal and to read corresponding call number owner's information from the database and to transmit the information to the call number management program; and
   (d) means for pairing the call number and its communication terminal number and storing the pair data as a record in the database;
   (e) wherein each owner terminal includes means for sending a list restoration request to the service provider's system, and means in the service provider's system for responding to such a request by reading from the database call numbers corresponding with the owner terminal number from a backup list, together with the call number owner's information for the call numbers and transmitting the data to the call number management program.

9. The system of claim 8, wherein the call number owner's information includes owner's e-mail address, residence or business address, home page address, image information, sketch map, or selective combination of these.

10. The system of claim 8, wherein the call number owner information-providing means provides the owner's information which includes owner's e-mail address, residence address or business address, home page address, image information, sketch map, or selective combination of these as additional information.

11. The system of claim 10, wherein the call number owner's information-providing means provides the owner's information which further includes an image information of call number owner's photograph or advertisement image.

12. The system of claim 11, wherein the call number owner's information-providing means provides the information that has information about the mode of opening the information.

13. The system of claim 8, wherein each owner terminal is a mobile communication terminal or a wired digital phone.

14. A communication system comprising a plurality of owner terminals, each of which has a memory and a call number management program which automatically generates a list of call numbers and stores it in the memory, and a service provider's system having a database of call numbers and associated call number owner's information; each terminal being adapted to query the service provider's system to obtain the call number owner's information for numbers in the list and to store that information;
   wherein each owner terminal includes means for sending a list restoration request to the service provider's system, and means in the service provider's system for responding to such a query by reading from the database call numbers corresponding with the owner terminal number from a backup list, together with the call number owner's information for the call numbers and transmitting the data to the call number management program.

* * * * *